US009197984B2

United States Patent
Kaufman et al.

(10) Patent No.: US 9,197,984 B2
(45) Date of Patent: Nov. 24, 2015

(54) RFID DEVICE WITH WIDE AREA CONNECTIVITY

(75) Inventors: Jeffrey R. Kaufman, San Diego, CA (US); Julian Durand, San Diego, CA (US); Daniel Obodovski, San Diego, CA (US); Michael E. Akiki, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 13/090,109

(22) Filed: Apr. 19, 2011

(65) Prior Publication Data

US 2012/0268250 A1    Oct. 25, 2012

(51) Int. Cl.
*H04Q 5/22* (2006.01)
*H04W 4/00* (2009.01)
*H04W 4/02* (2009.01)
*H04W 88/06* (2009.01)

(52) U.S. Cl.
CPC .............. *H04W 4/008* (2013.01); *H04W 4/028* (2013.01); *H04W 88/06* (2013.01)

(58) Field of Classification Search
CPC .............. G06K 5/00; G06K 19/06037; G06K 7/10366; G06K 7/0008; G06K 7/01; G06K 7/10009; G06K 19/06028; G06K 19/06206; G06K 19/0723; G06K 19/07749; G06F 17/30; G06F 17/00; G06Q 10/087; G08B 13/2434
USPC .................. 340/10.1–10.6, 572.1–572.9; 235/375–385
See application file for complete search history.

(56) References Cited

U.S. PATENT DOCUMENTS

| | | | | |
|---|---|---|---|---|
| 5,940,006 | A | * | 8/1999 | MacLellan et al. ........... 370/314 |
| 5,952,922 | A | | 9/1999 | Shober |
| 6,177,861 | B1 | * | 1/2001 | MacLellan et al. .......... 340/10.1 |

(Continued)

FOREIGN PATENT DOCUMENTS

| | | |
|---|---|---|
| EP | 1947811 A1 | 7/2008 |
| JP | H10224258 A | 8/1998 |

(Continued)

OTHER PUBLICATIONS

Behera, S.; Maity, C.; "Active RFID tag in Real Time Location System." Systems, Signals and Devices, 2008. IEEE SSD 2008. 5th International Multi-Conference on , vol., no., pp. 1-7, Jul. 20-22, 2008. doi: 10.1109/SSD.2008.4632779.

(Continued)

*Primary Examiner* — Paul Obiniyi
(74) *Attorney, Agent, or Firm* — Bala M. Ramasamy

(57) ABSTRACT

Methods and apparatus relating to a radio frequency identification device (RFID) with wide-area connectivity are provided. In an example, a real-time location (RTL) monitoring device is provided. The RTL monitoring device includes a first radio-frequency identification (RFID) tag and an RFID interrogator configured to interrogate the first RFID tag and a second RFID tag. A long-range wireless transceiver is coupled to the RFID interrogator, and configured to communicate RFID data. The first RFID tag, the RFID interrogator, and the long-range wireless transceiver can be collocated in an enclosure separate from the second RFID tag. The RTL monitoring device is configured to aggregate a plurality of responses from the first and second RFID tags, and to communicate the aggregated RFID data with a second device, such as a satellite, a base station, and/or an eNodeB device.

53 Claims, 3 Drawing Sheets

(56) References Cited

U.S. PATENT DOCUMENTS

| | | | |
|---|---|---|---|
| 6,367,697 B1* | 4/2002 | Turner et al. | 235/440 |
| 6,657,549 B1* | 12/2003 | Avery | 340/8.1 |
| 6,714,121 B1* | 3/2004 | Moore | 340/10.3 |
| 6,791,452 B2* | 9/2004 | Fletcher et al. | 340/10.6 |
| 6,843,720 B2* | 1/2005 | Luciano et al. | 463/16 |
| 6,899,626 B1* | 5/2005 | Luciano et al. | 463/25 |
| 7,088,244 B2* | 8/2006 | Kimura | 340/572.1 |
| 7,152,791 B2* | 12/2006 | Chappidi et al. | 235/385 |
| 7,158,035 B2* | 1/2007 | Sakamoto et al. | 340/572.4 |
| 7,170,393 B2* | 1/2007 | Martin | 340/10.1 |
| 7,196,621 B2* | 3/2007 | Kochis | 340/539.13 |
| 7,212,563 B2* | 5/2007 | Boyd et al | 375/130 |
| 7,218,227 B2* | 5/2007 | Davis et al. | 340/572.1 |
| 7,221,258 B2* | 5/2007 | Lane et al. | 340/10.1 |
| 7,243,855 B2* | 7/2007 | Matsumoto et al. | 235/492 |
| 7,248,171 B2* | 7/2007 | Mishelevich | 340/573.1 |
| 7,289,067 B2* | 10/2007 | Ohishi | 343/700 MS |
| 7,301,439 B2* | 11/2007 | Hashimoto et al. | 340/10.51 |
| 7,333,018 B2* | 2/2008 | Singh et al. | 340/572.4 |
| 7,336,176 B2* | 2/2008 | Chang | 340/572.1 |
| 7,394,372 B2* | 7/2008 | Gloekler et al. | 340/572.1 |
| 7,400,253 B2* | 7/2008 | Cohen | 340/572.1 |
| 7,403,744 B2* | 7/2008 | Bridgelall | 455/41.2 |
| 7,432,874 B2* | 10/2008 | Meissner | 343/867 |
| 7,479,896 B2* | 1/2009 | Ho et al. | 340/928 |
| 7,525,431 B2* | 4/2009 | Britton et al. | 340/572.1 |
| 7,538,658 B2* | 5/2009 | Twitchell, Jr. | 340/10.1 |
| 7,538,681 B1* | 5/2009 | Sharma et al. | 340/572.7 |
| 7,576,650 B1* | 8/2009 | Ghaffari | 340/572.1 |
| 7,602,296 B2* | 10/2009 | Ulibarri | 340/572.1 |
| 7,652,576 B1* | 1/2010 | Crossno et al. | 340/572.1 |
| 7,656,290 B2* | 2/2010 | Fein et al. | 340/539.13 |
| 7,669,756 B2* | 3/2010 | Uchida et al. | 235/375 |
| 7,673,039 B2* | 3/2010 | Sakamoto et al. | 709/224 |
| 7,683,788 B2* | 3/2010 | Turner | 340/572.2 |
| 7,717,326 B2* | 5/2010 | Kumhyr et al. | 235/375 |
| 7,808,367 B2* | 10/2010 | Moore | 340/10.3 |
| 7,830,850 B2* | 11/2010 | Twitchell, Jr. | 370/338 |
| 7,830,852 B2* | 11/2010 | Twitchell, Jr. | 370/338 |
| 7,848,905 B2 | 12/2010 | Troxler et al. | |
| 7,889,080 B2* | 2/2011 | Chan | 340/572.1 |
| 7,924,141 B2* | 4/2011 | Tuttle | 340/10.1 |
| 7,940,736 B2* | 5/2011 | Twitchell, Jr. | 370/338 |
| 8,013,760 B2* | 9/2011 | Turnock et al. | 340/928 |
| 8,125,316 B2* | 2/2012 | Moore | 340/10.4 |
| 8,164,426 B1* | 4/2012 | Steinhart et al. | 340/10.4 |
| 8,184,005 B2* | 5/2012 | Kamel | 340/572.1 |
| 8,284,741 B2* | 10/2012 | Twitchell, Jr. | 370/338 |
| 8,294,554 B2* | 10/2012 | Shoarinejad et al. | 340/10.1 |
| 8,305,190 B2* | 11/2012 | Moshfeghi | 340/10.1 |
| 8,334,775 B2* | 12/2012 | Tapp et al. | 340/572.4 |
| 2001/0035815 A1* | 11/2001 | Fletcher et al. | 340/10.6 |
| 2002/0089434 A1* | 7/2002 | Ghazarian | 340/988 |
| 2002/0132583 A1* | 9/2002 | Jelinek | 455/41 |
| 2002/0190845 A1* | 12/2002 | Moore | 340/10.3 |
| 2003/0001725 A1* | 1/2003 | Moore | 340/10.3 |
| 2004/0038677 A1 | 2/2004 | Avery | |
| 2005/0040221 A1* | 2/2005 | Schwarz | 235/375 |
| 2005/0040227 A1* | 2/2005 | Schwarz, Jr. | 235/380 |
| 2005/0057341 A1* | 3/2005 | Roesner | 340/10.33 |
| 2005/0086108 A1* | 4/2005 | Sakamoto et al. | 705/14 |
| 2005/0093702 A1* | 5/2005 | Twitchell, Jr. | 340/572.8 |
| 2005/0110636 A1* | 5/2005 | Ghaffari | 340/539.27 |
| 2005/0127180 A1* | 6/2005 | Matsumoto et al. | 235/451 |
| 2005/0145187 A1* | 7/2005 | Gray | 119/174 |
| 2005/0174235 A1* | 8/2005 | Davis et al. | 340/539.13 |
| 2005/0212660 A1* | 9/2005 | Hansen et al. | 340/10.3 |
| 2005/0216119 A1 | 9/2005 | Hamilton | |
| 2005/0219050 A1* | 10/2005 | Martin | 340/572.1 |
| 2005/0258240 A1* | 11/2005 | Chappidi et al. | 235/385 |
| 2005/0258955 A1* | 11/2005 | Gloekler et al. | 340/539.13 |
| 2005/0280544 A1* | 12/2005 | Mishelevich | 340/573.1 |
| 2006/0006987 A1* | 1/2006 | Hashimoto et al. | 340/10.51 |
| 2006/0017634 A1* | 1/2006 | Meissner | 343/742 |
| 2006/0049256 A1* | 3/2006 | von Mueller et al. | 235/449 |
| 2006/0087431 A1* | 4/2006 | Shieh et al. | 340/572.1 |
| 2006/0187026 A1* | 8/2006 | Kochis | 340/539.13 |
| 2006/0202831 A1 | 9/2006 | Horch | |
| 2006/0238305 A1* | 10/2006 | Loving et al. | 340/10.1 |
| 2006/0253590 A1 | 11/2006 | Nagy et al. | |
| 2006/0290472 A1* | 12/2006 | Onderko et al. | 340/10.1 |
| 2006/0290499 A1* | 12/2006 | Chang | 340/572.1 |
| 2007/0008069 A1 | 1/2007 | Lastinger et al. | |
| 2007/0013541 A1* | 1/2007 | Harazin et al. | 340/825.49 |
| 2007/0018820 A1* | 1/2007 | Chand et al. | 340/572.1 |
| 2007/0018829 A1* | 1/2007 | Singh et al. | 340/572.4 |
| 2007/0063872 A1* | 3/2007 | Ho et al. | 340/928 |
| 2007/0077896 A1* | 4/2007 | Ho et al. | 455/78 |
| 2007/0080880 A1* | 4/2007 | Ohishi | 343/742 |
| 2007/0126557 A1* | 6/2007 | Kuhn | 340/10.34 |
| 2007/0138299 A1* | 6/2007 | Mitra | 235/492 |
| 2007/0171067 A1* | 7/2007 | Chan | 340/572.1 |
| 2007/0239840 A1 | 10/2007 | Ishikawa | |
| 2007/0241901 A1* | 10/2007 | Cage et al. | 340/572.1 |
| 2007/0241906 A1* | 10/2007 | Malik | 340/572.7 |
| 2007/0252698 A1* | 11/2007 | Turner | 340/572.2 |
| 2007/0265924 A1* | 11/2007 | Schwarz | 705/14 |
| 2007/0285241 A1* | 12/2007 | Griebenow et al. | 340/572.1 |
| 2007/0296595 A1* | 12/2007 | Moore | 340/572.7 |
| 2007/0296596 A1* | 12/2007 | Moore | 340/572.7 |
| 2008/0004798 A1* | 1/2008 | Troxler et al. | 701/207 |
| 2008/0030422 A1* | 2/2008 | Gevargiz et al. | 343/860 |
| 2008/0068173 A1* | 3/2008 | Alexis et al. | 340/572.7 |
| 2008/0079582 A1* | 4/2008 | Alexis et al. | 340/572.1 |
| 2008/0088449 A1* | 4/2008 | Tran | 340/572.1 |
| 2008/0103944 A1 | 5/2008 | Hagemann et al. | |
| 2008/0129458 A1* | 6/2008 | Twitchell | 340/10.1 |
| 2008/0129485 A1* | 6/2008 | Tuttle | 340/539.11 |
| 2008/0143482 A1* | 6/2008 | Shoarinejad et al. | 340/10.1 |
| 2008/0143483 A1* | 6/2008 | Twitchell | 340/10.1 |
| 2008/0143484 A1* | 6/2008 | Twitchell | 340/10.1 |
| 2008/0143485 A1* | 6/2008 | Frerking | 340/10.1 |
| 2008/0150723 A1* | 6/2008 | Twitchell | 340/572.4 |
| 2008/0186143 A1* | 8/2008 | George et al. | 340/10.3 |
| 2008/0186174 A1* | 8/2008 | Alexis et al. | 340/572.1 |
| 2008/0231426 A1* | 9/2008 | Kamel | 340/10.4 |
| 2008/0231451 A1* | 9/2008 | Kamel | 340/572.1 |
| 2008/0231456 A1* | 9/2008 | Matityaho | 340/572.7 |
| 2008/0238617 A1* | 10/2008 | Kuhl et al. | 340/10.1 |
| 2008/0238621 A1* | 10/2008 | Rofougaran et al. | 340/10.1 |
| 2008/0315772 A1* | 12/2008 | Knibbe | 315/149 |
| 2009/0009296 A1* | 1/2009 | Shafer | 340/10.1 |
| 2009/0043651 A1* | 2/2009 | Schwarz, Jr. | 705/14 |
| 2009/0058615 A1* | 3/2009 | Schultz | 340/10.4 |
| 2009/0096586 A1* | 4/2009 | Tubb | 340/10.33 |
| 2009/0102660 A1 | 4/2009 | Evans et al. | |
| 2009/0237216 A1* | 9/2009 | Twitchell, Jr. | 340/10.1 |
| 2009/0265106 A1* | 10/2009 | Bearman et al. | 701/300 |
| 2009/0265222 A1* | 10/2009 | Chatani et al. | 705/10 |
| 2009/0267768 A1* | 10/2009 | Fujiwara et al. | 340/572.1 |
| 2009/0276338 A1* | 11/2009 | Masermann et al. | 705/28 |
| 2009/0322537 A1* | 12/2009 | Tapp et al. | 340/572.4 |
| 2010/0007470 A1* | 1/2010 | Twitchell, Jr. | 340/10.1 |
| 2010/0060424 A1* | 3/2010 | Wild et al. | 340/10.1 |
| 2010/0085213 A1* | 4/2010 | Turnock et al. | 340/928 |
| 2010/0098425 A1* | 4/2010 | Kewitsch | 398/116 |
| 2010/0141449 A1* | 6/2010 | Twitchell, Jr. | 340/572.1 |
| 2010/0194533 A1* | 8/2010 | Sullivan et al. | 340/10.1 |
| 2010/0214065 A1* | 8/2010 | Maltseff et al. | 340/10.1 |
| 2010/0237996 A1* | 9/2010 | Turner | 340/10.1 |
| 2010/0271179 A1* | 10/2010 | Maltseff | 340/10.1 |
| 2011/0032081 A1* | 2/2011 | Wild | 340/10.42 |
| 2011/0079923 A1 | 4/2011 | Suh | |
| 2011/0096731 A1 | 4/2011 | Kamalaraj et al. | |
| 2011/0109434 A1* | 5/2011 | Hadsall, Sr. | 340/8.1 |
| 2011/0193685 A1* | 8/2011 | Tuttle | 340/10.2 |
| 2011/0248852 A1* | 10/2011 | Falk et al. | 340/572.1 |
| 2011/0257812 A1* | 10/2011 | Carpenter et al. | 701/2 |

(56) References Cited

U.S. PATENT DOCUMENTS

| | | | |
|---|---|---|---|
| 2011/0264495 A1* | 10/2011 | Hailey et al. | 705/14.16 |
| 2012/0161967 A1* | 6/2012 | Stern | 340/572.1 |
| 2012/0299704 A1* | 11/2012 | Kamel | 340/10.1 |

FOREIGN PATENT DOCUMENTS

| | | | |
|---|---|---|---|
| JP | 2004529049 A | 9/2004 |
| JP | 2005135227 A | 5/2005 |
| JP | 2005527920 A | 9/2005 |
| JP | 2007512208 A | 5/2007 |
| JP | 2008502559 A | 1/2008 |
| JP | 2008112264 A | 5/2008 |
| JP | 2009537887 A | 10/2009 |
| JP | 2010521036 A | 6/2010 |
| JP | 2011048600 A | 3/2011 |
| WO | WO-02077882 A1 | 10/2002 |
| WO | WO-2007132282 A1 | 11/2007 |
| WO | WO-2008121864 A1 | 10/2008 |

OTHER PUBLICATIONS

Bacheldor, B.; "Hybrid Tag Includes Active RFID, GPS, Satellite and Sensors," RFID Journal, http://www.rfidjournal.com/article/view/4635, Feb. 24, 2009, pp. 1-3.
International Search Report and Written Opinion—PCT/US2012/034274—ISA/EPO—Aug. 21, 2012.

\* cited by examiner

RFID DEVICE WITH WIDE AREA CONNECTIVITY

FIELD OF DISCLOSURE

This disclosure relates generally to electronics, and more specifically, but not exclusively, to apparatus and methods relating to a radio frequency identification device with wide area connectivity.

BACKGROUND

A conventional real-time location service (RTLS) provides inventory tracking within a factory or a warehouse. The RTLS system uses radio-frequency identification (RFID) tags and associated interrogation systems. The interrogation systems are coupled to a local server via a short-range radio network, such as a Wi-Fi network. A problem with the conventional RTLS system is that the conventional RTLS devices are not usable outside of the radio range of the short-range network.

Accordingly, there are long-felt industry needs for methods and apparatus that mitigate problems of conventional methods and apparatus, including a radio frequency identification tag with wide area connectivity.

SUMMARY

This summary provides a basic understanding of some aspects of the present teachings. This summary is not exhaustive in detail, and is neither intended to identify all critical features, nor intended to limit the scope of the claims.

In examples, provided are methods and apparatus for reading data from a plurality of radio-frequency identification (RFID) tags via a long-range wireless transmitter that is coupled to an RFID interrogator. First data from the first RFID tag in the plurality of RFID tags is received with the RFID interrogator. Second data from the second RFID tag in the plurality of RFID tags is also received with the RFID interrogator. At least one of the first and second data can be modified with at least one of a time stamp, a date stamp, a location stamp, and sensor data. The first data and the second data are aggregated into aggregate data, and the aggregate data is transmitted to a communication device with the long-range wireless transmitter. The aggregated RFID data can be aggregated in a data packet. The long-range wireless transmitter can be configured to communicate using at least one of Code Division Multiple Access (CDMA) multiplexing; a Worldwide Interoperability for Microwave Access (WIMAX) communication system; a Universal Mobile Telecommunications System (UMTS) communication system; a General Packet Radio Service (GPRS) communication system; a Global System for Mobile Telecommunications (GSM) communication system; an Enhanced Data rates for GSM Evolution (EDGE) communication system; a CDMA2000 communication system; and a Long Term Evolution (LTE) communication system. The communication device can be a radio access network, a satellite, and/or an eNodeB device. The first RFID tag, the RFID interrogator, and the long-range wireless transceiver can be collocated in an enclosure.

In an example, personal network data can be received from the low-rate wireless personal network transceiver and transmitted to the communication device with the long-range wireless transmitter. In a further example where the long-range wireless transmitter is coupled to a global positioning system (GPS) receiver, global positioning data is received from the GPS receiver and transmitted to the communication device with the long-range wireless transmitter.

Moreover, if the long-range wireless transmitter is coupled to a sensor port, sensor data is received from the sensor port, associated with the first RFID data, and transmitted to the communication device with the long-range wireless transmitter. The long-range wireless transmitter can be coupled to least one of a temperature sensor, a barometric pressure sensor, a magnetic field strength sensor, an electric field strength sensor, a light sensor, a position sensor, a humidity sensor, a radiation sensor, an ionizing radiation sensor, and an accelerometer to provide the sensor data via the sensor port.

In a further example, provided is a non-transitory computer-readable medium, comprising instructions stored thereon that, if executed by a processor, cause the processor to execute and/or control execution of at least a part of the methods described herein.

In another example, provided is an apparatus configured to read data from a plurality of radio-frequency identification (RFID) tags. The apparatus includes means for receiving first data from the first RFID tag in the plurality of RFID tags with the RFID interrogator and means for receiving second data from the second RFID tag in the plurality of RFID tags with the RFID interrogator. The apparatus can also include means for modifying at least one of the first and second data with at least one of a time stamp, a date stamp, a location stamp, and sensor data. The apparatus also includes means for aggregating the first data and the second data into aggregated data and means for transmitting the aggregated data to a communication device with the long-range wireless transmitter. The aggregated RFID data can be aggregated in a data packet. The long-range wireless transmitter can be configured to communicate using at least one of Code Division Multiple Access (CDMA) multiplexing; a Worldwide Interoperability for Microwave Access (WIMAX) communication system; a Universal Mobile Telecommunications System (UMTS) communication system; a General Packet Radio Service (GPRS) communication system; a Global System for Mobile Telecommunications (GSM) communication system; an Enhanced Data rates for GSM Evolution (EDGE) communication system; a CDMA2000 communication system; and a Long Term Evolution (LTE) communication system. The communication device can be a radio access network, a satellite, and/or an eNodeB device. The first RFID tag, the RFID interrogator, and the long-range wireless transceiver can be collocated in an enclosure.

In an example, the long-range wireless transmitter is coupled to a low-rate wireless personal network transceiver, and further includes means for receiving personal network data from the low-rate wireless personal network transceiver, as well as means for transmitting the personal network data to the communication device with the long-range wireless transmitter. Further, when the long-range wireless transmitter is coupled to a global positioning system (GPS) receiver, the apparatus can further include means for receiving global positioning data from the GPS receiver and means for transmitting the global positioning data to the communication device with the long-range wireless transmitter.

Moreover, when the long-range wireless transmitter is coupled to a sensor port, the apparatus can further include means for receiving sensor data from the sensor port, means for associating the sensor data with the first RFID data, and means for transmitting the sensor data to the communication device with the long-range wireless transmitter. The long-range wireless transmitter can be coupled to least one of a temperature sensor, a barometric pressure sensor, a magnetic field strength sensor, an electric field strength sensor, a light sensor, a position sensor, a humidity sensor, a radiation sensor, an ionizing radiation sensor, and an accelerometer to provide the sensor data via the sensor port.

The apparatus can be integrated in a semiconductor die, and can be integrated into a device, selected from the group consisting of a set top box, music player, video player, entertainment unit, navigation device, communications device, personal digital assistant (PDA), fixed location data unit, and a computer. In a further example, provided is a non-transitory computer-readable medium, comprising instructions stored thereon that, if executed by a lithographic device, cause the lithographic device to fabricate at least a part of the apparatus.

In another example, provided is an apparatus configured for real-time location monitoring. The apparatus includes a first radio-frequency identification (RFID) tag, as well as an RFID interrogator configured to interrogate the first RFID tag and a second RFID tag, and to aggregate a plurality of responses from the first RFID tag and the second RFID tag. The RFID interrogator can be configured to modify at least one response in the plurality of responses with at least one of a time stamp, a date stamp, a location stamp, and sensor data. The aggregated RFID data can be aggregated in a data packet. The apparatus also includes a long-range wireless transceiver coupled to the RFID interrogator, and configured to communicate the aggregated RFID data with a second device. The long-range wireless transceiver can be configured to communicate using at least one of Code Division Multiple Access (CDMA) multiplexing; a Worldwide Interoperability for Microwave Access (WIMAX) communication system; a Universal Mobile Telecommunications System (UMTS) communication system; a General Packet Radio Service (GPRS) communication system; a Global System for Mobile Telecommunications (GSM) communication system; an Enhanced Data rates for GSM Evolution (EDGE) communication system; a CDMA2000 communication system; and a Long Term Evolution (LTE) communication system. The first RFID tag can be configured to be programmed with data received from the long-range wireless transceiver. The long-range wireless transceiver can be configured to communicate the aggregated RFID data via a radio access network to a core network. The first RFID tag, the RFID interrogator, and the long-range wireless transceiver can be collocated in an enclosure. The second device can be a satellite or an eNodeB device. Moreover, in another example, the apparatus can include the second device and a server coupled to the second device.

In a further example, the apparatus further includes a low-rate wireless personal network transceiver coupled to the long-range wireless transceiver. The long-range wireless transceiver can be configured to communicate personal network data between the low-rate wireless personal network transceiver and the second device. In another example, the apparatus can further include a global positioning system (GPS) receiver coupled to the long-range wireless transceiver. The long-range wireless transceiver can be configured to communicate global positioning data between the GPS receiver and the second device.

A sensor port can be coupled to the long-range wireless transceiver, and the long-range wireless transceiver can be configured to communicate sensor data between the sensor port and the second device. At least one of a temperature sensor, a barometric pressure sensor, a magnetic field strength sensor, an electric field strength sensor, a light sensor, a position sensor, a humidity sensor, a radiation sensor, an ionizing radiation sensor, and an accelerometer can be coupled to the sensor port.

The apparatus can be integrated in a semiconductor die, and can be integrated into a device, selected from the group consisting of a set top box, music player, video player, entertainment unit, navigation device, communications device, personal digital assistant (PDA), fixed location data unit, and a computer. In a further example, provided is a non-transitory computer-readable medium, comprising instructions stored thereon that, if executed by a lithographic device, cause the lithographic device to fabricate at least a part of the apparatus.

The foregoing has broadly outlined some of the features and technical advantages of the present teachings in order that the detailed description that follows may be better understood. Additional features and advantages are also described. The conception and disclosed embodiments can be readily utilized as a basis for modifying or designing other structures for carrying out the same purposes of the present teachings. Such equivalent constructions do not depart from the technology of the teachings as set forth in the appended claims. The novel features which are characteristic of the teachings, together with further objects and advantages, are better understood from the detailed description and the accompanying figures. Each of the figures is provided for the purpose of illustration and description only, and does not define limits of the present teachings.

BRIEF DESCRIPTION OF THE DRAWINGS

The accompanying drawings are presented to describe examples of the present teachings, and are not provided as limitations.

Figure 1:
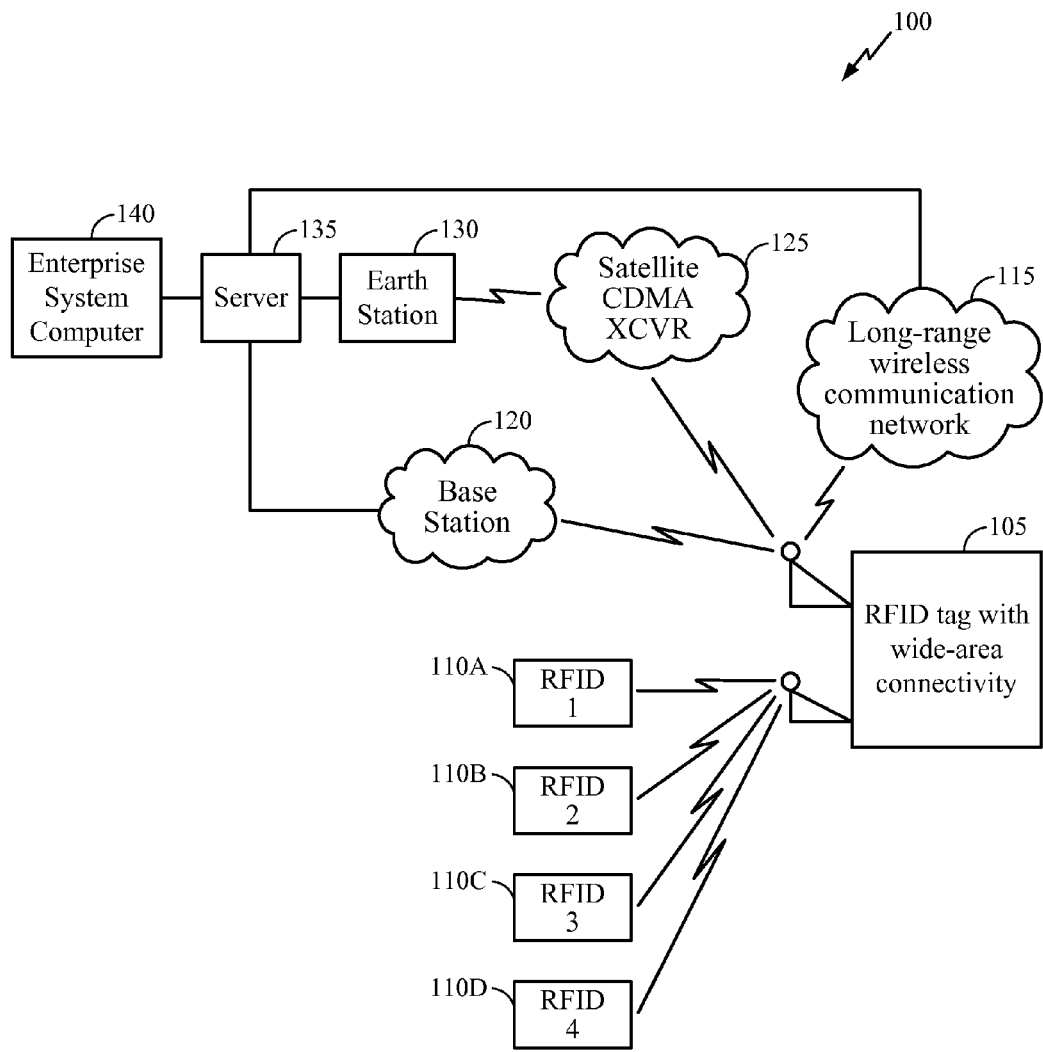
FIG. 1 depicts a block diagram of an exemplary real-time location monitoring system.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Examples of the current teachings are disclosed in this application's text and related drawings. The examples advantageously address the long-felt industry needs, as well as other previously unidentified needs, and mitigate shortcomings of the conventional methods and apparatus. Alternate embodiments may be devised without departing from the scope of the invention. Additionally, conventional elements of the current teachings may not be described in detail, or may be omitted, to avoid obscuring aspects of the current teachings.

The word "exemplary" is used herein to mean "serving as an example, instance, or illustration." Any embodiment described as "exemplary" is not necessarily to be construed as preferred or advantageous over other embodiments. Likewise, the term "embodiments of the invention" does not require that all embodiments of the invention include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures.

It should be noted that the terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As employed herein two elements can be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

It should be understood that the term "signal" can include any signal such as a data signal, audio signal, video signal, multimedia signal. Information and signals can be represented using any of a variety of different technologies and techniques. For example, data, instructions, commands, information, signals, bits, symbols, and chips that can be referenced throughout this description can be represented by voltages, currents, electromagnetic waves, magnetic fields or particles, optical fields or particles, or any combination thereof.

It should be understood that any reference to an element herein using a designation such as "first," "second," and so forth does not generally limit the quantity or order of those elements. Rather, these designations can be used herein as a convenient method of distinguishing between two or more elements or instances of an element. Thus, a reference to first and second elements does not mean that only two elements can be employed, or that the first element must precede the second element. Also, unless stated otherwise a set of elements can comprise one or more elements. In addition, terminology of the form "at least one of: A, B, or C" used in the description or the claims means "A or B or C or any combination of these elements."

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including", when used herein, specify the presence of stated features, integers, steps, operations, elements, and/or components, but do not preclude the presence or addition of one or more other features, integers, steps, operations, elements, components, and/or groups thereof.

In the following description, certain terminology is used to describe certain features. The term "mobile device" includes, but is not limited to, a mobile phone, a mobile communication device, personal digital assistant, mobile palm-held computer, a wireless device, and/or other types of mobile devices typically carried by individuals and/or having some form of communication capabilities (e.g., wireless, infrared, short-range radio, etc.).

Introduction

Methods and apparatus relating to a radio frequency identification device (RFID) with wide area connectivity are provided. In an example, a real-time location (RTL) monitoring device is provided. The RTL monitoring device includes a first radio-frequency identification (RFID) tag and an RFID interrogator configured to interrogate and to aggregate a plurality of responses from the first RFID tag and a second RFID tag. A wireless transceiver is coupled to the RFID interrogator. The wireless transceiver is configured to communicate the aggregated RFID data with a second device, such as a satellite and/or an eNodeB device. The first RFID tag, the RFID interrogator, and the wireless transceiver can be collocated in an enclosure that can be separate from the second RFID tag. The RTL monitoring device can also include a processor coupled to the RFID interrogator. The wireless transceiver and the second device communicate via a wireless communications system that is compatible with at least one of the following standards: Code Division Multiple Access (CDMA), Worldwide Interoperability for Microwave Access (WIMAX), Universal Mobile Telecommunications System (UMTS), General Packet Radio Service (GPRS), Global System for Mobile Telecommunications (GSM), Enhanced Data rates for GSM Evolution (EDGE), CDMA2000, 3GPP Long Term Evolution (LTE), and variations thereof.

DESCRIPTION OF THE FIGURES

FIG. 1 depicts a block diagram of an exemplary real-time location monitoring system (RTLS) 100. The RTLS 100 advantageously mitigates the problems of conventional methods and apparatus by communicating via a long-range wireless network that has a range greater than that of conventional devices. The RTLS 100 has an RFID tag with wide-area connectivity 105 that acts as an RFID tag with wide-area RTL capability, enabling use inside in factories, warehouses, stores, distribution centers, depots, and storage facilities. The RFID tag with wide-area connectivity 105 is also used on goods carried by cargo containers and vehicles (e.g. trucks, carts, boats, ships, busses, aircraft, automobiles, spacecraft, trams, and trains), and can be interrogated at long distances while being carried by these cargo containers and vehicles.

The RFID tag with wide-area connectivity 105 interrogates other RFID tags 110A-D, which can be active and/or passive tags. The RFID tag with wide-area connectivity 105 then aggregates the responses. The RFID tag with wide-area connectivity 105 then sends the aggregated responses via a long-range wireless communication network 115 (e.g., a radio access network, a core network), via a base station 120 (e.g., an eNodeB), and/or via a satellite transceiver 125 and earth station 130. In examples, the long-range wireless communication network 115 is compatible with at least one of the following standards: Code Division Multiple Access (CDMA), Worldwide Interoperability for Microwave Access (WIMAX), Universal Mobile Telecommunications System (UMTS), General Packet Radio Service (GPRS), Global System for Mobile Telecommunications (GSM), Enhanced Data rates for GSM Evolution (EDGE), CDMA2000, 3GPP Long Term Evolution (LTE), and variations thereof. In an example, the aggregated responses are encrypted prior to transmission. The destination of the aggregated responses is a server 135. The server 135 communicates the aggregated responses to an enterprise computing system 140, such as an enterprise resource planning (ERP) system (e.g., running SAP or Oracle software). A reverse communication also takes place. For example, the enterprise computing system 140 sends data to be written to the RFID tag with wide-area connectivity 105 and/or the RFID tags 110A-D.

The RFID tag with wide-area connectivity 105 provides advantages of backward-compatibility with an existing RFID communication infrastructure and long-range remote RFID data communication. Data stored in the RFID tag with wide-area connectivity 105 can be sent and retrieved not only by the server 135, but also by other RFID interrogators, including conventional RFID interrogators, such as those conventionally found in warehouses and factories. Thus, conventional RFID interrogators can read and/or write data to the RFID tag with wide-area connectivity 105. In an example, the server 135 originates RFID data and sends the RFID data to the RFID tag with wide-area connectivity 105. The RFID tag with wide-area connectivity 105 stores the RFID data. Then, a conventional RFID interrogator interrogates the RFID tag with wide-area connectivity 105, and reads the stored RFID data.

The RFID tag with wide-area connectivity 105 also time stamps and location stamps RFID data. Time and location updates are manually requested or automatically requested by the server 135. Also, environmental conditions can be monitored by the RFID tag with wide-area connectivity 105. Exemplary environmental conditions that are monitored include temperature, vibration, barometric pressure, magnetic field strength, electric field strength, exposure to light, position, humidity, ionizing radiation exposure, and/or exposure to specific chemicals. Statistical data (e.g., maximum value, minimum value, average value, mean value, differential value between multiple sensors, etc.) detailing the environmental exposure can also be determined to form additional environmental sensor data. For example, a difference between an outside and an inside temperature is determined. The environmental sensor data is associated with RFID data, and is communicated via the RFID tag with wide-area connectivity 105 to the long-range wireless communication network 115, the base station 120, and/or the satellite transceiver 125. For example, the RFID tag with wide-area connectivity 105 monitors a temperature to which an object having an RFID (e.g., a container of frozen food) is exposed during transit, and alerts the server 135 if the temperature is out of a range. The server 135 then alerts a person to the out-of-range condition, so that appropriate action can be taken.

Figure 2:
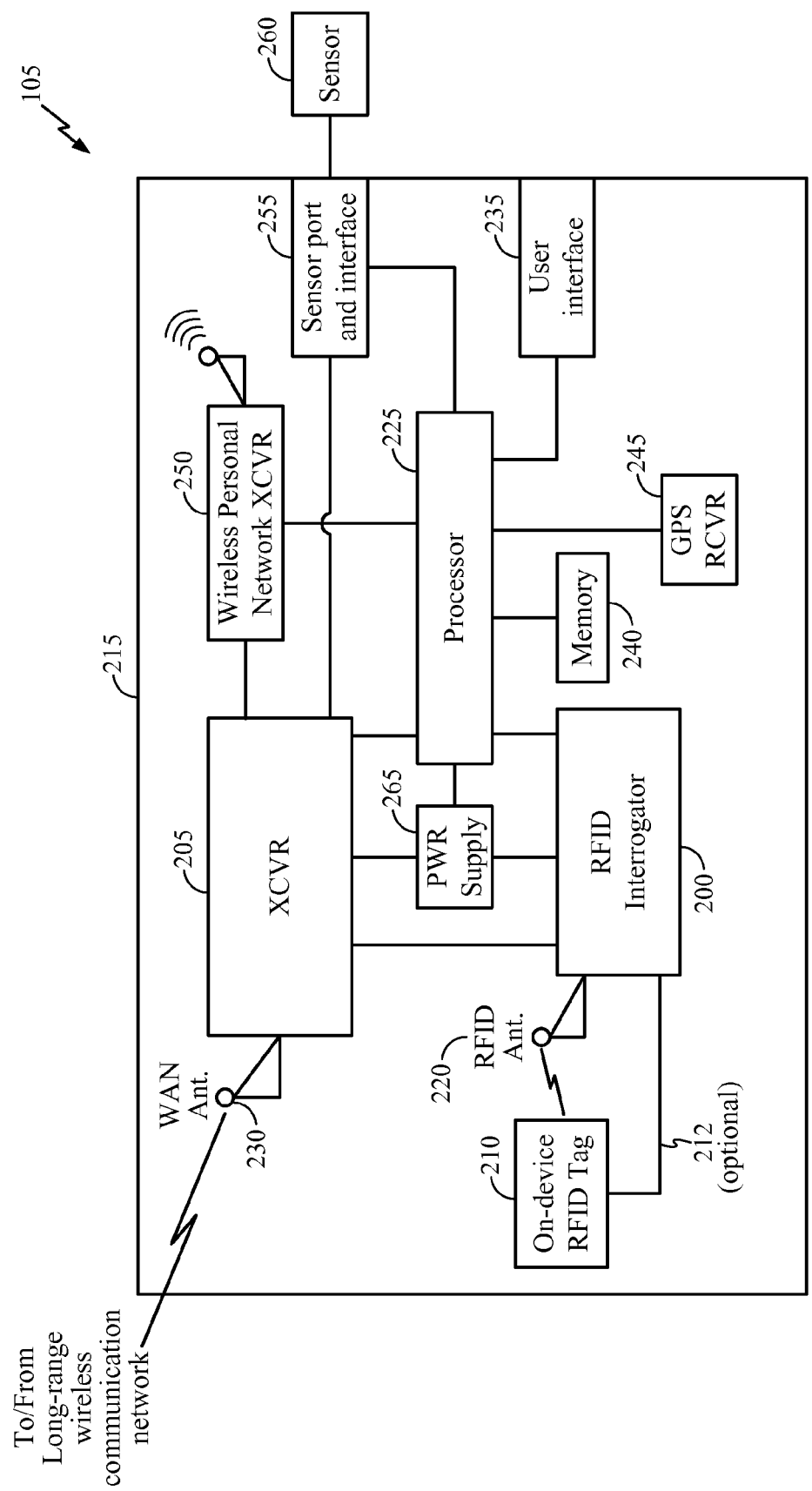
FIG. 2 depicts an exemplary radio-frequency identification (RFID) tag with wide-area connectivity.

FIG. 2 depicts the exemplary RFID tag with wide-area connectivity 105. The RFID tag with wide-area connectivity 105 includes an RFID interrogator 200 and a transceiver 205 combined with an on-device RFID tag 210. The on-device RFID tag 210 can be an active tag or a passive tag. In an example, the on-device RFID tag 210 is coupled to the RFID interrogator 200 via a wire 212. This hardwired coupling can be used as an alternative to wireless interrogation of the on-device RFID tag 210. The RFID interrogator 200, the transceiver 205, and the on-device RFID tag 210 are in a common enclosure 215. The RFID interrogator 200 includes an RFID antenna 220, as well as circuits to read and write data to and from an RFID. The RFID interrogator 200 is coupled to a processor 225 and/or the transceiver 205 via a data connection, such as an inter-integrated circuit (I2C) serial bus.

The transceiver 205 includes a wide area network antenna 230 and a non-volatile memory for storing RFID data. In an example, the transceiver 205 is an inGEO-compatible device. An inGeo device is a tracking device having a Global Positioning System (GPS) locator that communicates tracking data over a CDMA-compatible network.

The processor 225 controls the processes of the RFID tag with wide-area connectivity 105. A user interface 235 provides user access to the processor 225 and a memory 240 that stores RFID data and processor instructions. The transceiver 205, the processor 225, and/or the RFID interrogator 200 aggregates RFID data from multiple RFID devices, such as the RFID tags 110A-D. The RFID tag with wide-area connectivity 105 then communicates the aggregated data via the transceiver 205 and the wide area network antenna 230 to a compatible device.

The RFID tag with wide-area connectivity 105 optionally includes a GPS receiver 245, such as an Assisted-GPS receiver, as well as low-rate wireless personal network transceiver 250, such as a Zigbee-compatible transceiver and/or a WiFi-compatible transceiver. Data from the GPS receiver 245 and/or the low-rate wireless personal network transceiver 250 is aggregated and transmitted with the RFID data. The RFID tag with wide-area connectivity 105 also has a sensor port 255, to which a sensor 260, such as an accelerometer, thermometer, and the like is coupled to provide sensor data. Data from the sensor port 255 is also aggregated and transmitted with the RFID data.

A power supply 265 provides power for the circuits in the RFID tag with wide-area connectivity 105, such as the transceiver 205, the processor 225, and the RFID interrogator 200. The power supply 265 can be a rechargeable battery, such as a nickel cadmium (NiCd) battery, nickel metal hydride (NiMH) battery, and a lithium ion (Li-ion) battery.

Figure 3:
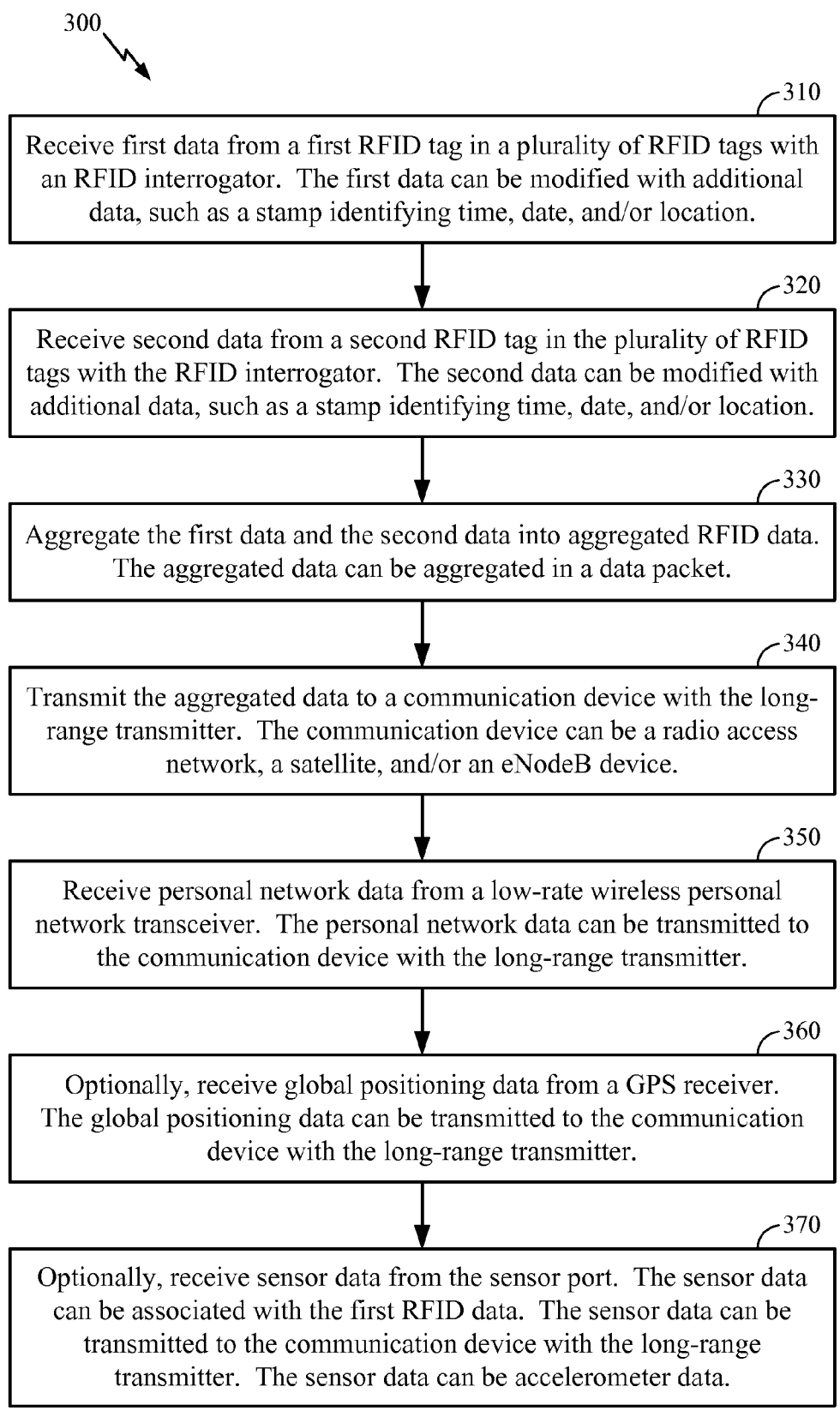
FIG. 3 depicts an exemplary method for reading data from a plurality of RFID tags via a code-division multiple access transmitter that is coupled to an RFID interrogator.

FIG. 3 depicts an exemplary method 300 for reading data from a plurality of radio-frequency identification (RFID) tags via a long- and short-range transmitter that is coupled to an RFID interrogator. The method 300 can be performed by the apparatus described hereby, such as the RFID tag with wide-area connectivity 105.

In step 310, first data from the first RFID tag in the plurality of RFID tags is received by the RFID interrogator. The first data can be modified with additional data, such as a stamp identifying time, date, and/or location.

In step 320, second data from the second RFID tag in the plurality of RFID tags is received by the RFID interrogator. The second data can be modified with additional data, such as a stamp identifying time, date, and/or location.

In step 330, the first data and the second data are aggregated into aggregated RFID data. The aggregated data can be aggregated in a data packet.

In step 340, the aggregate data is transmitted to a communication device with the transmitter. The communication device can be a radio access network, a satellite, and/or an eNodeB device. In an example, the first RFID tag, the RFID interrogator, and the transceiver can be collocated in an enclosure.

In step 350, personal network data is received from a low-rate wireless personal network transceiver. The personal network data is transmitted to the communication device with the transmitter.

In step 360, global positioning data is received from the GPS receiver. The global positioning data is transmitted to the communication device with the long-range transmitter.

In step 370, sensor data is received from the sensor port. The sensor data is associated with the first RFID data. The sensor data is transmitted to the communication device with the transmitter. The sensor data can be data relating to acceleration, temperature, vibration, barometric pressure, magnetic field strength, electric field strength, exposure to light, position, humidity, ionizing radiation exposure, and/or exposure to specific chemicals.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In some aspects, the teachings herein can be employed in a multiple-access system capable of supporting communication with multiple users by sharing the available system resources (e.g., by specifying one or more of bandwidth, transmit power, coding, interleaving, and so on). For example, the teachings herein can be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein can be designed to implement one or more standards, such as IS-95, cdma2000, IS-856, W-CDMA, TDSCDMA, and other standards. A CDMA network can implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein can be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure can be described using 3GPP terminology, it is to be understood that the teachings herein can be applied to 3GPP (e.g., Re199, Re15, Re16, Re17) technology, as well as 3GPP2 (e.g., 1×RTT, 1×EV-DO Re10, RevA, RevB) technology and other technologies. The techniques can be used in emerging and future networks and interfaces, including Long Term Evolution (LTE).

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

An embodiment of the invention can include a computer readable media embodying a method described herein. Accordingly, the invention is not limited to illustrated examples and any means for performing the functionality described herein are included in embodiments of the invention.

The disclosed devices and methods can be designed and can be configured into GDSII and GERBER computer files, stored on a computer readable media. These files are in turn provided to fabrication handlers who fabricate devices, based on these files, with a lithographic device. The resulting products are semiconductor wafers that are then cut into semiconductor die and packaged into a semiconductor chip. The chips are then employed in devices described herein.

Nothing that has been stated or illustrated is intended to cause a dedication of any component, step, feature, object, benefit, advantage, or equivalent to the public, regardless of whether it is recited in the claims.

While this disclosure shows exemplary embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order.

What is claimed is:

1. An apparatus comprising:
   an internal radio frequency identification (RFID) interrogator configured to interrogate at least one external RFID tag and to aggregate one or more responses from the at least one external RFID tag to form aggregated RFID data;
   an internal RFID tag configured to send the aggregated RFID data to an external interrogator;
   a sensor port configured to receive sensor data; and
   a long-range wireless transceiver coupled to the sensor port and to the internal RFID interrogator and configured to:
      send the aggregated RFID data and the sensor data via a network;
      send an alert to the second device in response to the sensor data satisfying a threshold; and
      receive write data, wherein the internal RFID tag is configured to store the write data.

2. The apparatus of claim 1, wherein the aggregated RFID data is aggregated in a data packet.

3. The apparatus of claim 1, wherein the long-range wireless transceiver is configured to send the aggregated RFID data via a radio access network to a core network.

4. The apparatus of claim 1, wherein the second device is a satellite.

5. The apparatus of claim 1, wherein the second device is an eNodeB device.

6. The apparatus of claim 1, wherein the internal RFID tag, the internal RFID interrogator, and the long-range wireless transceiver are collocated in an enclosure.

7. The apparatus of claim 1, further comprising a low-rate wireless personal network transceiver coupled to the long-range wireless transceiver, wherein the long-range wireless transceiver is configured to communicate network data from the low-rate wireless personal network transceiver to the second device.

8. The apparatus of claim 1, further comprising a global positioning system (GPS) receiver coupled to the long-range wireless transceiver, wherein the long-range wireless transceiver is configured to communicate global positioning data from the GPS receiver to the second device.

9. The apparatus of claim 1, wherein the sensor data includes temperature data, wherein the temperature data indicates a temperature value, and wherein the sensor data satisfies the threshold if the temperature value is equal to or greater than the threshold.

10. The apparatus of claim 1, further comprising at least one of a temperature sensor, a barometric pressure sensor, a magnetic field strength sensor, an electric field strength sensor, a light sensor, a position sensor, a humidity sensor, a radiation sensor, an ionizing radiation sensor, or an accelerometer coupled to the sensor port.

11. The apparatus of claim 1, wherein the internal RFID interrogator is configured to modify at least one response of the one or more responses with at least one of a time stamp, a date stamp, a location stamp, or sensor data.

12. The apparatus of claim 1, wherein the long-range wireless transceiver is configured to communicate using at least one of Code Division Multiple Access (CDMA) multiplexing; a Worldwide Interoperability for Microwave Access (WIMAX) communication system; a Universal Mobile Telecommunications System (UMTS) communication system; a General Packet Radio Service (GPRS) communication system; a Global System for Mobile Telecommunications (GSM) communication system; an Enhanced Data rates for GSM Evolution (EDGE) communication system; a CDMA2000 communication system; or a Long Term Evolution (LTE) communication system.

13. The apparatus of claim 1, further comprising a device, selected from the group consisting of a set top box, music player, video player, entertainment unit, navigation device, communications device, personal digital assistant (PDA), fixed location data unit, and a computer, into which the internal RFID interrogator and the long-range wireless transceiver are integrated.

14. The apparatus of claim 1, wherein at least a part of the apparatus is integrated in a semiconductor die.

15. A method comprising:
receiving, at a first radio frequency identification (RFID) interrogator of a device, first data from a first RFID tag of a plurality of RFID tags external to the device;
receiving second data from a second RFID tag of the plurality of RFID tags;
aggregating the first data and the second data into aggregated RFID data;
receiving sensor data from a sensor port of the device;
transmitting, using a long-range wireless transceiver internal to the device, the aggregated RFID data to a communication device;
transmitting, via the long-range wireless transceiver, the sensor data to the communication device;
transmitting, via the long-range wireless transceiver, an alert to the communication device in response to the sensor data satisfying a threshold;
transmitting, using an RFID tag internal to the device, the aggregated RFID data to a second RFID interrogator external to the device;
receiving write data at the long-range wireless transceiver; and
storing the write data at the RFID tag internal to the device.

16. The method of claim 15, wherein the aggregated RFID data is aggregated in a data packet.

17. The method of claim 15, wherein the communication device is a radio access network device.

18. The method of claim 15, wherein the communication device is a satellite.

19. The method of claim 15, wherein the communication device is an eNodeB device.

20. The method of claim 15, wherein the long-range wireless transceiver is coupled to a low-rate wireless personal network transceiver, and further comprising:
receiving personal network data from the low-rate wireless personal network transceiver; and
transmitting the personal network data to the communication device with the long-range wireless transceiver.

21. The method of claim 15, wherein the long-range wireless transceiver is coupled to a global positioning system (GPS) receiver, and further comprising:
receiving global positioning data from the GPS receiver; and
transmitting the global positioning data to the communication device with the long-range wireless transceiver.

22. The method of claim 15, further comprising associating the sensor data with the first data.

23. The method of claim 15, wherein the long-range wireless transceiver is coupled to least one of a temperature sensor, a barometric pressure sensor, a magnetic field strength sensor, an electric field strength sensor, a light sensor, a position sensor, a humidity sensor, a radiation sensor, an ionizing radiation sensor, or an accelerometer to provide the sensor data via the sensor port.

24. The method of claim 15, further comprising modifying at least one of the first and second data with at least one of a time stamp, a date stamp, a location stamp, or sensor data.

25. The method of claim 15, wherein the long-range wireless transceiver is configured to communicate using at least one of Code Division Multiple Access (CDMA) multiplexing; a Worldwide Interoperability for Microwave Access (WIMAX) communication system; a Universal Mobile Telecommunications System (UMTS) communication system; a General Packet Radio Service (GPRS) communication system; a Global System for Mobile Telecommunications (GSM) communication system; an Enhanced Data rates for GSM Evolution (EDGE) communication system; a CDMA2000 communication system; or a Long Term Evolution (LTE) communication system.

26. An apparatus comprising:
means for receiving first data from a first radio frequency identification (RFID) tag of a plurality of external RFID tags;
means for receiving second data from a second RFID tag of the plurality of external RFID tags;

means for aggregating the first data and the second data into aggregated RFID data;
means for transmitting the aggregated RFID data to an external RFID interrogator;
means for receiving sensor data from a sensor port;
means for transmitting the aggregated RFID data to a communication device, for transmitting the sensor data to the communication device, and for transmitting an alert to the communication device in response to the sensor data satisfying a threshold; and
means for receiving write data, wherein the write data is stored at the means for transmitting the aggregated RFID data to the external RFID interrogator.

27. The apparatus of claim 26, wherein the aggregated RFID data is aggregated in a data packet.

28. The apparatus of claim 26, wherein the communication device is a radio access network device.

29. The apparatus of claim 26, wherein the communication device is a satellite.

30. The apparatus of claim 26, wherein the communication device is an eNodeB device.

31. The apparatus of claim 26, wherein the means for transmitting the aggregated RFID data to the communication device is a long-range wireless transmitter coupled to a low-rate wireless network transceiver comprising:
means for receiving personal network data from the low-rate wireless network transceiver; and
means for transmitting the personal network data to the communication device with the long-range wireless transmitter.

32. The apparatus of claim 26, wherein the means for transmitting the aggregated RFID data to the communication device is coupled to a global positioning system (GPS) receiver and is configured to:
receive global positioning data from the GPS receiver; and
transmit the global positioning data to the communication device.

33. The apparatus of claim 26, further comprising means for associating the sensor data with the first data.

34. The apparatus of claim 26, wherein the sensor port is coupled to at least one of a temperature sensor, a barometric pressure sensor, a magnetic field strength sensor, an electric field strength sensor, a light sensor, a position sensor, a humidity sensor, a radiation sensor, an ionizing radiation sensor, or an accelerometer to provide the sensor data via the sensor port.

35. The apparatus of claim 26, further comprising means for modifying at least one of the first or second data with at least one of a time stamp, a date stamp, a location stamp, or sensor data.

36. The apparatus of claim 26, wherein the means for transmitting the aggregated RFID data to the communication device is configured to communicate using Code Division Multiple Access (CDMA) multiplexing.

37. The apparatus of claim 26, wherein the means for transmitting the aggregated RFID data to the communication device is configured to communicate via at least one of a Worldwide Interoperability for Microwave Access (WIMAX) communication system; a Universal Mobile Telecommunications System (UMTS) communication system; a General Packet Radio Service (GPRS) communication system; a Global System for Mobile Telecommunications (GSM) communication system; an Enhanced Data rates for GSM Evolution (EDGE) communication system; a CDMA2000 communication system; or a Long Term Evolution (LTE) communication system.

38. The apparatus of claim 26, further comprising a device, selected from the group consisting of a set top box, music player, video player, entertainment unit, navigation device, communications device, personal digital assistant (PDA), fixed location data unit, and a computer, into which the means for transmitting the aggregated RFID data to the external RFID interrogator and the means for transmitting the aggregated RFID data to the communication device via a network are integrated.

39. The apparatus of claim 26, wherein at least a part of the apparatus is integrated in a semiconductor die.

40. A non-transitory computer-readable medium, comprising instructions stored thereon that, if executed by a processor, cause the processor to perform operations comprising:
controlling reception of first data from a first radio-frequency identification (RFID) tag of a plurality of external RFID tags using an internal RFID interrogator;
controlling reception of second data from a second RFID tag of the plurality of external RFID tags using the internal RFID interrogator;
controlling aggregation of the first data and the second data into aggregated RFID data;
controlling transmission of the aggregated RFID data to an external RFID interrogator using an internal RFID tag;
controlling reception of sensor data from a sensor port;
initiating transmission, to a communication device using a long-range wireless transceiver, of the aggregated RFID data, of the sensor data, and of an alert, wherein the transmission of the alert is in response to the sensor data satisfying a threshold;
controlling reception of write data using the long-range wireless transceiver; and
controlling storage of the write data at the internal RFID tag.

41. The non-transitory computer-readable medium of claim 40, wherein the aggregated RFID data is aggregated in a data packet.

42. The non-transitory computer-readable medium of claim 40, wherein the communication device is a radio access network device.

43. The non-transitory computer-readable medium of claim 40, wherein the communication device is a satellite.

44. The non-transitory computer-readable medium of claim 40, wherein the communication device is an eNodeB device.

45. The non-transitory computer-readable medium of claim 40, wherein the long-range wireless transceiver is coupled to a low-rate wireless network transceiver, the operations further comprising:
controlling reception of network data from the low-rate wireless network transceiver; and
controlling transmission of the network data to the communication device with the long-range wireless transceiver.

46. The non-transitory computer-readable medium of claim 40, wherein the long-range wireless transceiver is coupled to a global positioning system (GPS) receiver, the operations further comprising:
controlling reception of global positioning data from the GPS receiver; and
controlling transmission of the global positioning data to the communication device with the long-range wireless transceiver.

47. The non-transitory computer-readable medium of claim 40, wherein the operations further comprise controlling association of the sensor data with the first data.

48. The non-transitory computer-readable medium of claim 40, wherein the long-range wireless transceiver is coupled to at least one of a temperature sensor, a barometric pressure sensor, a magnetic field strength sensor, an electric field strength sensor, a light sensor, a position sensor, a humidity sensor, a radiation sensor, an ionizing radiation sensor, or an accelerometer to provide the sensor data via the sensor port.

49. The non-transitory computer-readable medium of claim 40, wherein the operations further comprise controlling modification of at least the first data or the second data with at least one of a time stamp, a date stamp, a location stamp, or sensor data.

50. The apparatus of claim 1, wherein the internal RFID interrogator is coupled to the internal RFID tag via a wire.

51. The apparatus of claim 1, wherein the internal RFID interrogator is configured to interrogate the internal RFID tag via a wire.

52. The apparatus of claim 1, wherein the sensor data includes temperature data.

53. The apparatus of claim 1, wherein the internal RFID interrogator is further configured to send the write data to the at least one external RFID tag.

* * * * *